United States Patent [19]

Grimm

[11] Patent Number: 4,990,122
[45] Date of Patent: Feb. 5, 1991

[54] SHAFT FAILURE INDICATOR
[75] Inventor: Duane H. Grimm, Rockford, Ill.
[73] Assignee: Sundstrand Corporation, Rockford, Ill.
[21] Appl. No.: 135,456
[22] Filed: Dec. 21, 1987
[51] Int. Cl.$^5$ .................. B64C 13/34; F16H 25/22; G08B 21/00
[52] U.S. Cl. .................. 464/23; 74/665 R; 244/75 R
[58] Field of Search ............ 464/23, 160; 74/412 TA, 74/665 R; 116/273, 281, 282, DIG. 21; 244/75 R; 340/671, 672

[56] References Cited
U.S. PATENT DOCUMENTS

| | | | |
|---|---|---|---|
| 3,169,178 | 2/1965 | Notchev et al. | 200/61.46 |
| 3,935,754 | 2/1976 | Comollo | 464/23 X |
| 4,276,758 | 7/1981 | Coman et al. | 464/23 |
| 4,559,023 | 12/1985 | Uchibaba et al. | 464/30 |
| 4,625,843 | 12/1986 | Maltby et al. | 192/8 R |

FOREIGN PATENT DOCUMENTS 1045188 11/1958 Fed. Rep. of Germany .

Primary Examiner—Daniel P. Stodola
Attorney, Agent, or Firm—Antonelli, Terry, Stout & Kraus

[57] ABSTRACT

A system for damping relative rotation between two axially driven shafts (30) rotating in the same direction and for indicating failure of one of the shafts is disclosed. The system includes a coupling mechanism (34), coupling the driven shafts together to transmit torque from one of the shafts to the other of the shafts upon a predetermined relative angular rotation between the two shafts and providing a free zone of relative rotation between the shafts without transmitting torque between the shafts when the shafts have moved less than a predetermined angular rotation with respect to each other within the free zone of rotation. A mechanism (32) is provided which is coupled to the shafts for producing movement of a movable member (40) which is directly proportional to the degree of relative rotation between the shafts (30) during relative rotation between the shafts less than the predetermined relative angular rotation within the free zone of rotation. A retarding mechanism (62) is provided for retarding the motion of the movable member (40) with a force for retarding movement of the movable member when the shafts are rotating relatively with respect to each other through an angle less than the predetermined relative angular rotation within the free zone of rotation which restricts the rate of relative motion of the shafts with respect to each other. Further, an indicator (66) is provided which produces a signal upon movement of the shafts with respect to each other through the predetermined relative angular rotation within the free zone of rotation.

23 Claims, 3 Drawing Sheets

SHAFT FAILURE INDICATOR

TECHNICAL FIELD

The present invention relates to systems for indicating a failure in one of two drivelines which are axially aligned and driven in the same direction. Furthermore, the present invention relates to systems for damping relative rotation between two axially aligned driven shafts rotating in the same direction when high torque loads are applied.

BACKGROUND ART

U.S. Pat. No. 3,935,754 discloses a shaft failure indicator for indicating when a failure has occurred in a primary drive train 21. A secondary drive train 29 is provided which functions as the primary source of power for devices to be actuated when the primary drive line fails. A coupling unit 27 has a free zone of motion which prevents torque from being transmitted from a primary control unit 19 to the secondary drive train 29 unless a primary driveline failure has occurred. A failure indicator 104 is provided in the coupling unit 27 to detect when relative motion between the input shaft 25 and the secondary drive train 29 is equal to the free zone of motion which is indicative of a failure in the primary drive train 21. The movement of the drive shaft 25 with respect to the secondary drive train 29 through the free zone of motion causes movement of a member axially with respect to the axis of the drive shaft 25 to activate an indicator. In a second embodiment of the failure indicator, a pair of threaded control nuts engage a worm wheel which is driven by a worm gear 101 that is connected to the drive shaft 25. A difference in the velocity of the drive shaft 25 with respect to the secondary drive train 29 causes a displacement of the control nuts 115 in a direction parallel with the axis of the secondary drive train 29 to activate an indicator. The system of U.S. Pat. No. 3,935,754 does not have any mechanism for damping the rate of relative rotation of the drive shaft 25 with respect to the secondary drive train 29 in the free zone of motion.

U.S. Pat. No. 4,559,023 discloses a torque damper having a damping mechanism positioned concentrically with a driven shaft and in communication with a variable volume hydraulic chamber. A function of the system in U.S. Pat. No. 4,559,023 is to absorb transient torque loads.

The assignee of the present invention manufactured a system having a primary driveline and a backup driveline which was included in the Dash 8 aircraft sold by DeHavilland Corporation.

DISCLOSURE OF INVENTION

The present invention provides a system for damping relative rotation between two axially aligned driven shafts rotating in the same direction to prevent relative rotation upon high torque loads and further provides an indication of shaft failure. The shaft failure indication is free from erroneous indications caused by high torque loads of any origin including torque perturbations produced by impacting system mechanical stops while full power is applied. Furthermore, the present invention provides protection for a mechanical coupling which provides a free zone of rotation between the two driven shafts within which free zone of motion no torque is to be transmitted. Finally, the present invention provides a highly reliable system for indicating when a shaft failure occurs in one of the two driven shafts and which is not responsive to high torque perturbations in one or both of the driven drive shafts.

A system for damping relative rotation between two axially aligned driven shafts rotating in the same direction includes a coupling device coupling the driven shafts together to transmit torque from one of the shafts to the other of the shafts upon a predetermined relative angular rotation between the two shafts and providing a free zone of relative rotation between the shafts without transmitting torque between the shafts when the shafts have moved less than the predetermined angular rotation with respect to each other within the free zone of rotation; means coupled to the shafts for moving a movable member a distance which is proportional to the degree of relative rotation between the shafts during relative rotation between the shafts less than the predetermined angular rotation; and a retarder for retarding the motion of the movable member with a force when the shafts are rotating relatively with respect to each other through an angle less than the predetermined relative angular rotation which restricts the rate of motion of the shafts with respect to each other.

In a first embodiment of the invention, the movable member engages first and second fixedly positioned drivers which are spaced apart from each other by a constant distance. The first and second drivers are respectively rotated in response to rotation of the first and second shafts with torque from the drivers being transmitted to the movable member to move the movable member in a first direction when a rate of rotation of the first driver is higher than the rate of rotation of the second driver and to move the movable member in a second direction when the rate of rotation of the second driver is higher than the rate of rotation of the first driver.

In a second embodiment of the invention, the means for moving a movable member a distance which is proportional to the degree of relative rotation between the shafts during relative rotation between the shafts less than the predetermined relative angular rotation functions as a differential and includes first and second sun gears respectively fixedly connected to the first and second shafts; a plurality of pairs of first and second planetary gears, each pair being rotatably journaled on a common shaft and being disposed around the periphery of the sun gears, the first planetary gears of each pair being driven by the first sun gear and the second planetary gear of each pair being driven by the second sun gear; a first fixed ring gear engaging each of the first planetary gears; a second ring gear rotatably journaled and engaging each of the second planetary gears; and wherein the movable member is coupled to the second ring gear to translate movement of the second ring gear into movement of the movable member.

In a preferred embodiment of the invention, the retarder uses hydraulic fluid to provide a retarding force directly proportional to the rate of movement of the movable member to fully transmit high torque loads between the driven shafts without relative rotation between the shafts and to permit relative rotation between the shafts for lower torque loads. The retarder includes a piston which is axially movable within a closed chamber, with the piston defining first and second fluid chambers between the piston and end walls of the chamber and a fluid passage connecting the first and second chambers with a cross-sectional area less than a cross-sectional area of the piston, hydraulic fluid being disposed in the chambers and the fluid passage and moving between the first and second chambers in response to movement of the movable member. The movable member is connected to the piston and movable in the axial direction so that movement of the movable member is damped by movement of hydraulic fluid through the fluid passage.

In the first embodiment of the invention, the movable member includes a shaft having first and second portions, the first portion having one or more threads or splines having a pitch extending in a first rotational direction and the second portion having one or more threads or splines having a pitch extending in a second rotational direction opposite to the first rotational direction. The first driver has a threaded or splined bore engaging the one or more threads or splines of the first portion and the second driver has a threaded or splined bore engaging one or more threads of the second portion. Furthermore, a third driver is connected to the first shaft and rotates the first driver without slippage and a fourth driver is connected to the second shaft and rotates the second driver without slippage. Preferably, the third driver is a gear with gear teeth which engage gear teeth carried by the first driver and the fourth driver is a gear with gear teeth which engage gear teeth carried by the second driver.

Preferably, the invention further includes a failure indicator for indicating when a failure occurs in one of the axially aligned driven shafts. The failure indicator includes a signal generator for producing a signal indicating a shaft failure in response to movement of the movable member a predetermined distance. Preferably, the predetermined distance is moved in response to relative rotation of the shafts through the predetermined relative angular rotation with respect to each other which is equal to the free zone of rotation provided by the coupling between the shafts. The signal generator includes a switch having a movable switch member with a predetermined relative movement of the two shafts with respect to each other causing the movable member to be moved closing an electrical circuit in the switch.

A system for detecting and indicating a failure in one of the two axially aligned driven shafts rotating in the same direction in accordance with the invention includes a coupling mechanism coupling the driven shafts together to transmit torque from one of the shafts to the other of the shafts upon a predetermined relative angular rotation between the two shafts and providing a free zone of relative rotation between the shafts without transmitting torque between the shafts when the shafts have moved less than the predetermined angular rotation with respect to each other within the free zone of rotation; means coupled to the shafts for moving a movable member a distance which is proportional to the degree of relative rotation between the shafts within the predetermined relative angular rotation within the free zone of rotation; and an indicator for detecting movement of the movable member a predetermined distance. In accordance with a first embodiment of the invention, the movable member engages first and second fixedly positioned drivers which are spaced apart from each other by a constant distance, the first and second drivers being respectively rotated in response to rotation of the first and second shafts with torque from the drivers being transmitted to the movable member to move the movable member in a first direction when a rate of rotation of the first driver is higher than a rate of rotation of the second driver and to move the movable member in a second direction when the rate of rotation of the second driver is higher than the rate of rotation of the first driver. In the second embodiment of the invention, the means coupled to the shafts for moving a movable member a distance which is proportional to the degree of relative rotation between the shafts during relative rotation between the shafts less than the predetermined degree of relative rotation in the free zone of rotation is a differential and includes first and second sun gears respectively fixedly connected to the first and second shafts, a plurality of pairs of first and second planetary gears, each pair being journaled on a common shaft and being disposed around the periphery of the sun gears, the first planetary gear of each pair being driven by the first sun gear and the second planetary gear of each pair being driven by the second sun gear, a first fixed ring gear engaging each of the first planetary gears, a second ring gear rotatably journaled and engaging each of the second planetary gears and the movable member is coupled to the sun gear to translate movement of the second ring gear into movement of the movable member. In both embodiments, movement of the movable member the predetermined distance corresponds to relative movement of the shafts substantially equal to the predetermined relative angular rotation within the free zone of rotation.

BEST MODE FOR CARRYING OUT THE INVENTION

Figure 1:
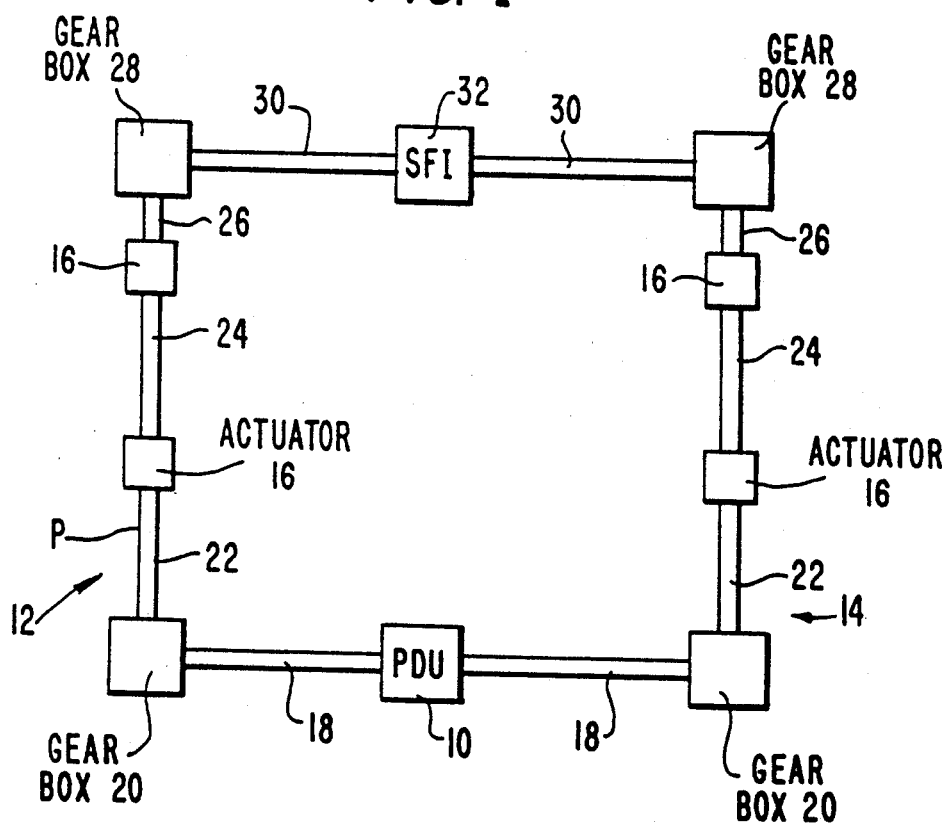
FIG. 1 illustrates a block diagram of a system for driving actuators in an airframe which is particularly suitable for utilization of the present invention.

FIG. 1 illustrates a block diagram of a system particularly suitable for use with the present invention. The system powers various actuators in an airframe by two driven drivelines. The system of FIG. 1 includes a power drive unit 10 (PDU) having a pair of outputs for applying torque to drivelines generally designated by the reference numerals 12 and 14 respectively. While illustrated as being symmetrical to the PDU 10, the drivelines 12 and 14 may be asymmetrical with respect to the PDU. Each of the drivelines 12 and 14 contains one or more actuators 16 which may be devices for closing cargo doors on an aircraft, flaps on the wings of an aircraft, or other devices requiring power. The power drive unit 10 may be a hydrostatic motor for producing output torque applied to drivelines 12 and 14 which is powered from a pressurized source of hydraulic fluid. It should be understood that the PDU 10 contains a brake for braking the rate of rotation of the rotating element within the hydrostatic motor which s activated to slow the motor down and further that stoppage of the hydrostatic motor is accomplished by disconnection of the pressurized hydraulic source fluid from the rotary element contained in the power drive unit while braking force is applied. The stopping of the PDU 10 quickly under full load can produce a torque wave which is transmitted through the drivelines 12 and 14 that can produce a false indication of shaft failure. The driveline 12 includes a first drive shaft 18, a gear box 20 for changing the direction of the torque transmitted by the first drive shaft 18 to a second direction, a second drive shaft 22 which drives an actuator 16, a third drive shaft 24 which is connected between the output of the first actuator 16 and the input to a second actuator 16, a fourth drive shaft 26 which is connected between the second actuator 16 and a gear box 28 for changing the direction of torque transmitted by the fourth drive shaft 26 from a first direction to a second direction, a fifth drive shaft 30 connected between the output of the gear box 28 and a shaft failure indicator 32 as described below. Similarly, the second driveline 14 contains the same elements described above with reference to the first driveline 12 which are identified by like reference numerals and are therefore not specifically discussed.

The system of FIG. 1 will continue to operate if there is a failure in either of one of the drivelines 12 or 14. In other words, each of the actuators 16 can be driven from torque transmitted from either direction or from both directions simultaneously. The redundancy in the torque drive provided by the first and second drivelines 12 and 14 to each of the actuators 16 is for purposes of preventing a catastrophic failure of an airframe as a consequence of one of the two drivelines failing. For example, if driveline 12 has a break within the second drive shaft 22 at point P, torque will be transmitted by the power drive unit in a counterclockwise direction so that the actuator 16, which is normally driven by the second driveline 22, receives torque from the third drive shaft 24. In the normal mode of operation, each of the drivelines 12 and 14 is driven at precisely the same speed so that the fifth drive shafts 30 of the first and second drivelines 12 and 14 are rotating at precisely the same speed and in the same direction so that there is no relative motion between them.

Through dynamic analysis of the system illustrated in FIG. 1, the assignee discovered that false shaft failure indications were produced by a shaft failure indicator 32 designed by the assignee as a consequence of not having any mechanism from preventing high torque perturbations from tripping the shaft failure indicator 32. It was discovered that if an electronic sensor rotationally coupled to the system driveline, for producing a signal to shut down the application of hydraulic fluid to the PDU 10 prior to the actuator coming to rest at a final position, failed, a full force impact of the system on the PDU mechanical stop caused high torque perturbations in the driveline, which was sensed by the shaft failure indicator 32 as a false indication of shaft failure. The shaft failure indicator had a jaw clutch which permitted a free zone of rotation through a predetermined relative angular rotation, such as 30 degrees, without transmitting torque from one of the fifth drive shafts 30 to the other of the fifth drive shafts within the free zone of rotation and further transmitted torque from one of the fifth drive shafts to the other of the fifth drive shafts when relative rotation between them occurred which was equal to the predetermined relative angular rotation so that no further free zone of motion existed.

It was discovered that the false shaft failure indications could be eliminated by having high torque loads directly transmitted between the fifth drive shafts 30 without relative rotation therebetween by means of a hydraulic retarding mechanism for retarding motion of a movable member which activated the failure indicator as described below in detail.

Figure 2:
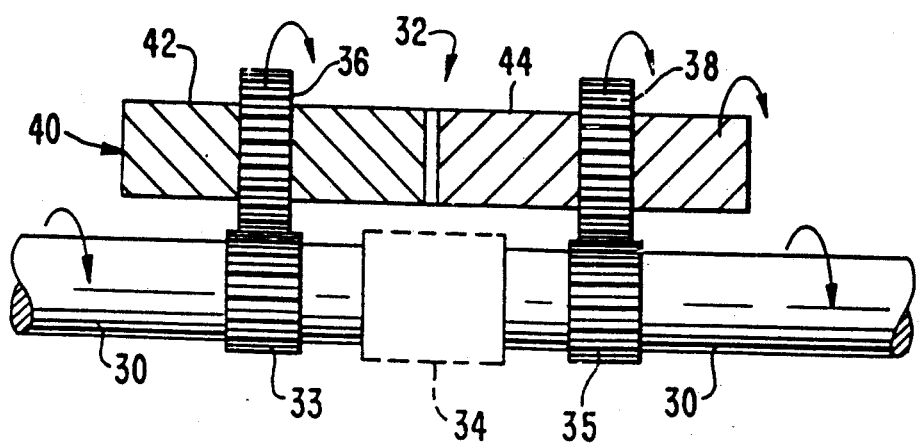
FIG. 2 is a simplified side elevation illustrating the relationship between first and second drive shafts and a movable member which is moved in response to relative rotation of the first and second shafts with respect to each other.

FIG. 2 illustrates a simplified partial diagram of the shaft failure indicator 32 in accordance with a first embodiment of the present invention. During normal operation, the fifth drive shafts 30 are rotated in the same direction at precisely the same rotational velocity so that no relative rotational movement occurs between the fifth drive shafts. A jaw clutch 34, of any conventional design, is coupled between the fifth drive shafts 30. The jaw clutch has a free zone of free relative rotation between the fifth drive shafts, such as 30 degrees, in which no torque is transmitted between one of the fifth drive shafts 30 and the other of the fifth drive shafts for relative movement within the free zone of rotation. During normal operation, the jaw clutch operates such that it is within the aforementioned 30-degree zone of free rotation. Furthermore, when a 30-degree relative motion occurs between the fifth drive shafts 30, the jaw clutch 34 fully transmits torque from one of the fifth drive shafts to the other of the fifth drive shafts which occurs upon a failure in one of the first and second drivelines 12 and 14. Each of the fifth drive shafts 30 has a plurality of straight splines. Gears 33 and 35 are attached to the fifth drive shafts 30 in an axially fixed position by means of the splines in accordance with the embodiment of FIG. 3. The gear 33 drives gear 36 and the gear 35 drives gear 38. The first gear 36 is held in a fixed position with respect to the axis of the left-hand fifth drive shaft 30 by a holding mechanism not illustrated. The second gear 38 is held in a fixed position with respect to the axis of the right-hand fifth drive shaft 30 by a holding mechanism not illustrated. Each of the first and second gears 36 and 38 has a cylindrical bore which has a thread or alternatively a plurality of helical splines. A cylindrical shaft generally designated by the reference numerals 40 is provided which moves axially in response to differential rotation between the left-hand and right-hand fifth drive shafts 30 into axial motion. The shaft 40 has first and second portions 42 and 44 which respectively are threaded or splined to engage the tapped bore of the first and second gears 36 and 38. The pitch of the threads of the first and second portions 42 and 44 is opposite to each other.

The shaft failure indicator (not illustrated) is tripped in response to either leftward or rightward movement of the shaft 40 caused by relative rotation between the left-hand and right-hand fifth drive shafts 30. If the left-hand fifth drive shaft 30 is rotating with a higher velocity than the right-hand fifth drive shaft, the shaft 40 will move to the left and trip the indicator when rotation through the free zone is complete. If the right-hand fifth drive shaft 30 is moving with a higher velocity than the left-hand fifth drive shaft 30, the shaft 40 will be moved to the right and trip the indicator when rotation through the free zone is complete. It should be understood that the shaft failure indicator is tripped by a predetermined degree of axial motion of the shaft 40 to the left or right and further that a hydraulic retarding mechanism is connected to the shaft 40 to retard its movement which prevents high torque loads from causing the fifth drive shafts 30 from moving completely through the predetermined relative angular rotation of the free zone of rotation. The degree of retarding force for restricting axial movement of the shaft 40 is chosen to permit unrestricted rotation of the fifth drive shafts 30 through the free zone of rotation in response to a shaft failure in one of the first and second drivelines 12 and 14 and to prevent substantial rotation through the free zone of rotation in response to high torque loads or perturbations.

Figure 3:
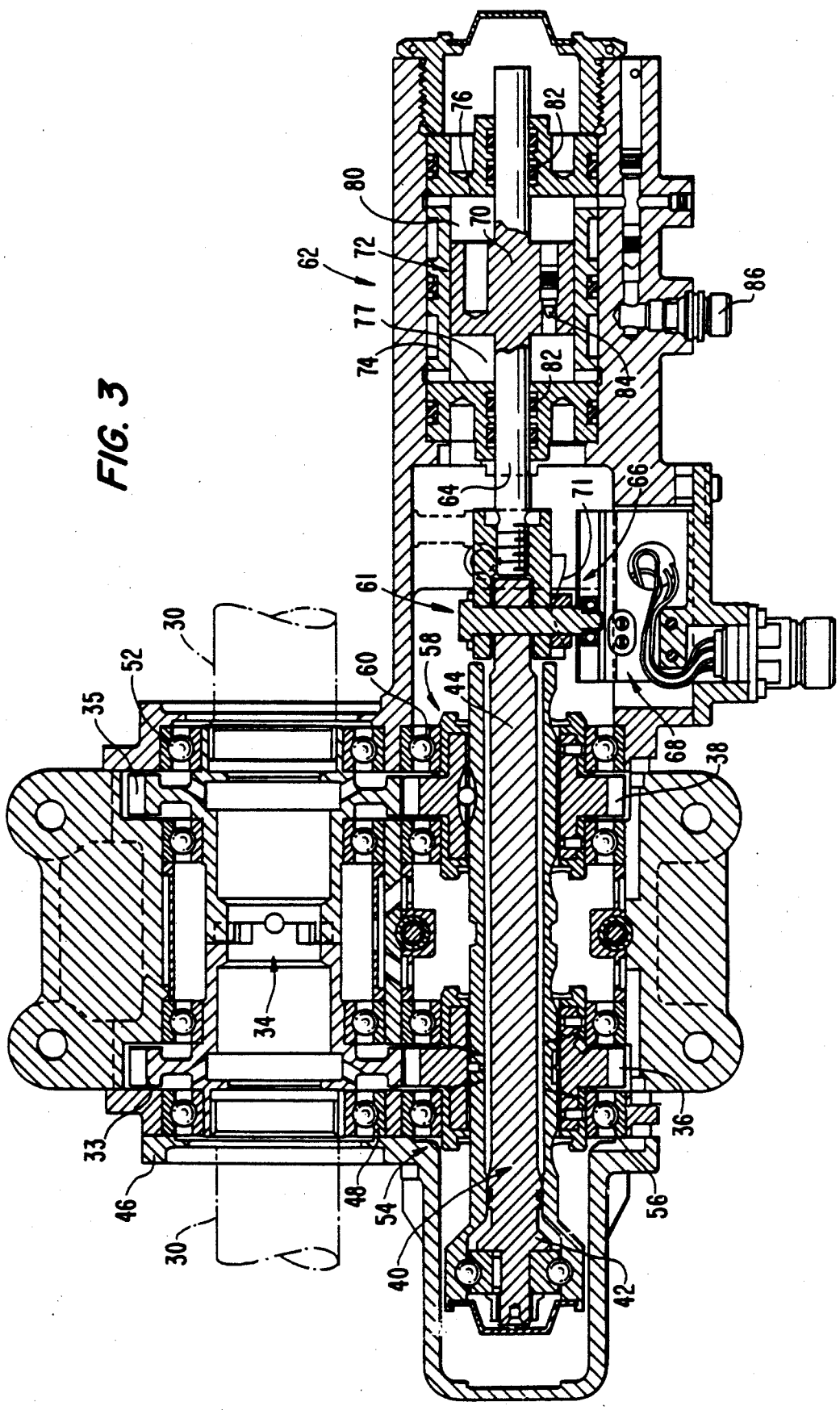
FIG. 3 is a longitudinal cross-section of a preferred embodiment of the present invention.

FIG. 3 illustrates a longitudinal cross-section of a preferred embodiment of the present invention. Like reference numerals in FIGS. 2 and 3 are used to identify like parts. The embodiment of FIG. 3 senses relative rotation between the left-hand and right-hand fifth drive shafts 30 as follows. As explained above, a jaw clutch 34 couples the left-hand and right-hand fifth drive shafts 30 together to permit a free zone of rotation, which in the embodiment as illustrated is 30 degrees, through which torque is not transmitted between the left- and right-hand fifth drive shafts, and a complete transmission of torque between the left-and right-hand drive shafts after there has been 30 degrees of relative motion of the one shaft with respect to the other. This relative motion occurs when there is a shaft failure in either the first driveline 12 or the second driveline 14 but there is no torque transmission during normal operation for the reason that the respective left- and right-hand fifth drive shafts 30 are within the free zone of rotation in which no torque is transmitted. In the embodiment as illustrated, the left- and right-hand fifth drive shafts 30 have helical splines (not illustrated) or other mechanical fastening means which connect gears 33 and 35 fixedly to the shafts. Bearing 48 rotatably supports the left-hand fifth drive shaft 30 and is held in a fixed position with respect to the housing 46. The bearing 52 rotatably supports the right-hand fifth drive shaft 30 and is held in a fixed position with respect to housing 46. Torque is transmitted from the gear 33 to the gear 36 and torque is transmitted from the gear 35 to the gear 38. As described above with reference to FIG. 2, each of the gears 36 and 38 has a cylindrical bore containing either threads or helical splines. The gear 36 is held in a fixed axial position by a holding mechanism 54 which includes a bearing 56 which rotatably supports shaft 40. Similarly, gear 38 is held in a fixed axial position by a holding mechanism 58 which includes a bearing 60 which rotatably supports shaft 40. It should be noted that the holding mechanisms 54 and 58 are spaced apart by a fixed distance. The screw thread or helical splines contained in the bores of the gears 36 and 38 mate with corresponding threads or helical splines of shaft 40 as illustrated in FIG. 2. As described above with reference to FIG. 2, a differential speed between the rotation of the left- and right-hand fifth drive shafts 30 causes a corresponding left or right axial movement of the shaft 40.

FIG. 3 also illustrates the mechanism for indicating when a shaft failure has occurred and further a hydraulic mechanism for retarding the axial movement of the drive shaft 40 with a force which is directly proportional to the speed of movement of the shaft. The shaft 40 has a mechanical coupling 61 which connects the shaft 40 to an axially movable retarding mechanism 62 having a shaft 64 which is joined to the shaft 40. Indicator 66 contains a switch 68 which is closed by movement of a cam mechanism, as described below with reference to FIG. 4, in response to a leftward or rightward movement of the coupling 61 for a fixed distance. Movement of the shaft 40 either to the left or right in response to relative angular movement of the left- and right-hand fifth drive shafts 30 within the free zone of motion causes cam surface 71 to engage an element 88 of the switch 68 after a predetermined amount of motion to signal the occurrence of a fault in one of the first or second drivelines 12 or 14. The amount of motion along the cam surface 71 required to close switch 68 is chosen to be substantially equal to the amount of motion which is produced by relative angular movement of the left- and right-hand fifth drive shafts through the free zone of motion so that closing of the switch 68 occurs substantially simultaneously with the point at which torque is transmitted by the jaw clutch 34 between the left- and right-hand fifth drive shafts 30.

As was described above, the assignee discovered that false tripping signals were produced by an indicator when movement of the shaft 40 was not retarded which has been eliminated by the addition of retarding mechanism 62. The retarding mechanism 62 has a piston 70 integrally formed with the shaft 64. The piston 70 is housed within a cylindrical housing 72 having end walls 74 and 76. The piston 70 and the end wall 74 defines a first chamber 77. The piston 70 and the end wall 76 defines a second chamber 80. Suitable seals such as O rings 82 are provided to prevent fluid leakage around the shaft 64. The retarding force applied against movement of the shaft 40 is proportional to the relative cross-sectional areas of the piston 70 and the orifice 84. The degree of retarding force applied against movement of the shaft 40 is also directly proportional to the rate of movement of the shaft 40. The retarding force applied against movement of the shaft 40 being directly proportional to the rate of relative movement ensures that high transient torque loads are completely transmitted from one of the fifth drive shafts 30 to the other and do not cause the relative angular position of the left- and right-hand fifth drive shafts 30 to substantially move with respect to each other and permits a slow rate of relative rotation between these drive shafts to occur without substantial transmission of torque from one of the fifth drive shafts to the other in response to a failure in one of the first and second drivelines 12 and 14 which produces a true indication of shaft failure by the indicator 66. Furthermore, high torque perturbations in the drivelines 12 and 14 caused by impacting system mechanical stops with full power applied do not cause a shaft failure indication to be produced by indicator 66 for the reason that these torque perturbations are at least substantially transmitted between the fifth drive shafts 30 by the retarding mechanism 62 by the application of the retarding force to the drive shaft 40. Thus, the retarding mechanism prevents rapid relative movement of the fifth drive shafts 30 with respect to each other through the free zone of motion to prevent false shaft failure indication. It should be further understood that hydraulic fluid is applied to fitting 86 to maintain a sufficient supply of hydraulic fluid to the chambers 78 and 80 of the retarding mechanism 62.

Figure 4:
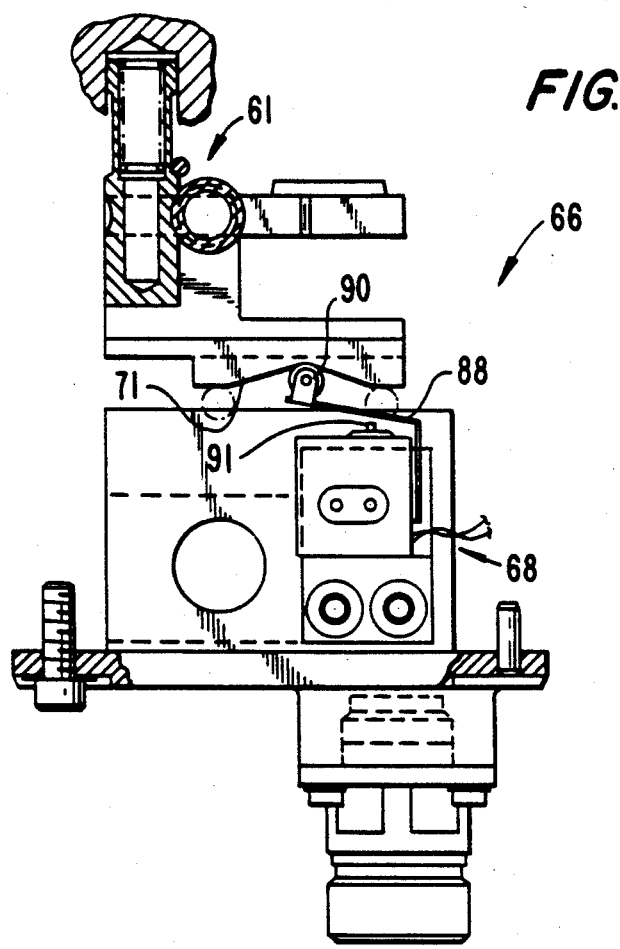
FIG. 4 illustrates the indicator 66 as viewed from the opposite side of FIG. 3.

FIG. 4 illustrates the indicator 66 as viewed from the opposite side of FIG. 3. Like reference numerals are used in FIGS. 3 and 4. The switch 68 includes a member 88 which includes a cam follower 90 which rides on the cam surface 71. Either leftward or rightward movement of the mechanical coupling 61 causes the cam follower 90 to ride up on the slope of the cam surface 71 to force the switching member 88 downward. The switch 68 closes an electrical circuit (not illustrated) when the switch member 88 engages the projection 91. While FIG. 4 illustrates a detailed view of an indicator 66, it should be understood that other forms of indicators which close an electrical switch in response to either a leftward or rightward movement of the shaft 40 may be used in practicing the present invention.

Figure 5:
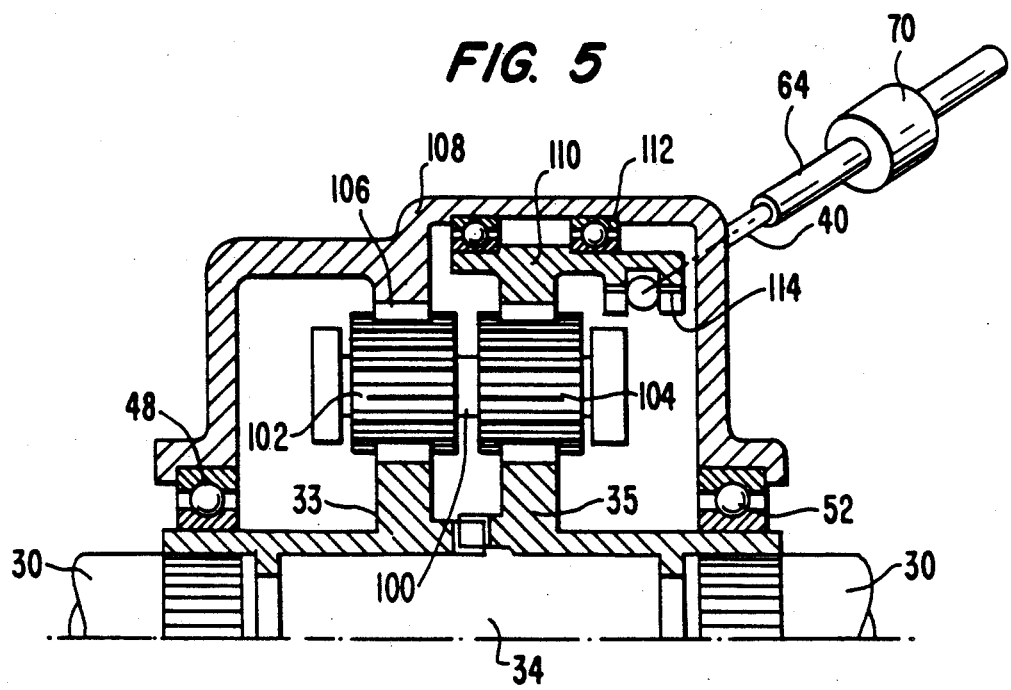
FIG. 5 is a partial sectional view illustrating a mechanism in accordance with a second embodiment of the invention for translating relative motion between first and second shafts into movement of a movable member.

FIG. 5 illustrates a partial sectional view of a second embodiment of the invention. FIG. 5 is identical to the embodiment of FIG. 3 regarding the mechanism of the left- and right-hand fifth drive shafts 30 but differs in the implementation of converting relative motion within the free zone of motion into a mechanical displacement proportional to the degree of rotation. Furthermore, it should be understood that the retarding mechanism 62 and the indicator 66 have been omitted and may be identical to that illustrated in FIG. 3. The embodiment of FIG. 5 has a combination of sun, planetary and ring gears to produce a mechanical displacement proportional to the relative rotation of the left- and right-hand fifth drive shafts 30 within the free zone of motion. The gears 33 and 35 function as sun gears. Furthermore, three or more shafts 100 are provided in a planetary gear arrangement with each shaft rotatably supporting a first gear 102 and a second gear 104. Each of the shafts 100 is disposed at 120-degree intervals around the periphery of sun gears 33 and 35. A fixed ring gear 106 is formed in housing 108 which encircles the axis of rotation of the left- and right-hand fifth drive shafts 30. The teeth of the fixed ring gear 106 engage the corresponding teeth of the first planetary gear 102 which in turn engage the teeth of the first sun gear 33. A ring gear 110 is rotatably journaled in the outside periphery of housing 108 by bearing 112. A ring gear 110 contains a coupling mechanism 114 which may be of any known design for connecting the ring gear to the shaft 40 to convert rotation of the ring gear into axial movement of the shaft 40, shaft 64 and piston 70. The embodiment of FIG. 5 functions to cause the rotation of the ring gear 110 through an angle which is directly proportional to the relative movement of the left- and right-hand fifth drive shafts within the free zone of rotation of the jaw clutch 34.

While the invention has been described in terms of its preferred embodiments, it should be understood that numerous modifications may be made thereto without departing from the spirit and scope of the invention as defined in the appended claims.

I claim:

1. A system for damping rotation between axially aligned first and second driven shafts rotating in the same direction comprising:
   (a) means coupling the driven shafts together to transmit torque from one of the shafts to the other of the shafts upon a predetermined relative angular rotation between the two shafts and providing a free zone of relative rotation between the shafts without transmitting torque between the shafts when the shafts have moved less than the predetermined angular rotation with respect to each other in the free zone of rotation;
   (b) means, coupled to the shafts, for moving a movable member a distance which is proportional to the degree of relative rotation between the shafts during relative rotation between the shafts less than the predetermined relative angular rotation within the free zone of rotation, the movable member engaging first and second fixedly positioned drivers which are spaced apart from each other by a constant distance, the first and second drivers being rotated in response to rotation of the first and second shafts with torque from the first and second drivers being transmitted to the movable member to move the movable member in a first direction when a rate of rotation of the first driver is higher than a rate of rotation of the second driver and to move the movable member in a second direction when the rate of rotation of the second driver is higher than the rate of rotation of the first driver; and
   (c) means for retarding the motion of the movable member with a retarding force when the shafts are rotating relatively with respect to each other through an angle less than the predetermined relative angular rotation within the free zone of rotation which restricts the rate of relative motion of the shafts with respect to each other.

2. A system in accordance with claim 1 wherein: the means for retarding uses hydraulic fluid.

3. A system in accordance with claim 2 wherein: the retarding force is proportional to a rate of movement of the movable member.

4. A system in accordance with claim 3 wherein:
   (a) the means for retarding comprises a piston which is axially movable within a closed chamber with the piston defining first and second fluid chambers between the piston and end walls of the chamber and a fluid passage connecting the first and second chambers with a cross-sectional area less than a cross-sectional area of the piston, hydraulic fluid being disposed in the chambers and the fluid passage and moving between the first and second chambers in response to movement of the movable member; and
   (b) the movable member is connected to the piston and movable in the axial direction so that movement of the movable member is damped by movement of the hydraulic fluid through the fluid passage.

5. A system in accordance with claim 1 wherein:
   (a) the movable member includes a shaft having first and second portions, the first portion having one or more threads or splines having a pitch extending in a first rotational direction and the second portion having one or more threads or splines having a pitch extending in a second rotational direction opposite to the first rotational direction;
   (b) the first driver having a bore with threads or splines engaging the one or more threads or splines of the first portion and the second driver having a bore with threads or splines engaging the one or more threads or splines of the second portion, and further comprising
   (c) first driving means connected to the first shaft and rotating the first driver without slippage; and
   (d) second driving means connected to the second shaft and rotating the second driver without slippage.

6. A system in accordance with claim 5 wherein:
   (a) the first driving means has gear teeth which engage gear teeth carried by the first driver; and
   (b) the second driving means has gear teeth which engage gear teeth carried by the second driver.

7. A system in accordance with claim 1 further comprising:
   means interposed between said axially aligned driven shafts for indicating when a failure occurs in one of the axially aligned driven shafts.

8. A system in accordance with claim 7 wherein the means for indicating comprises:
   means for producing a signal indicating a shaft failure in response to movement of the movable member a predetermined distance.

9. A system in accordance with claim 8 wherein the means for producing a signal comprises:
   a switch means having a movable switch member, a predetermined relative movement of the shaft with respect to each other causing the movable member to move and close an electrical circuit in the switch means, and produce the signal indicating shaft failure.

10. A system in accordance with claim 9 wherein:
    the predetermined relative movement of the two shafts is substantially equal to the predetermined angular rotation.

11. A system for damping relative rotation between first and second axially driven shafts rotating in the same direction comprising:
    (a) means coupling the driven shafts together to transmit torque from one of the shafts to the other of the shafts upon a predetermined relative angular rotation between the two shafts and providing relative rotation between the shafts without transmitting torque between the shafts when the shafts have moved less than the predetermined angular rotation with respect to each other in the free zone of rotation;
    (b) differential means, coupled to the shafts, for moving a movable member a distance which is proportional to the degree of relative rotation between the shafts within the predetermined degree of relative rotation with respect to each other in the free zone of rotation; and
    (c) means for retarding the motion of the movable member with a retarding force when the shafts are rotating relatively with respect to each other through an angle less than the predetermined relative angular rotation within the free zone of rotation which restricts the rate of relative motion of the first and second shafts with respect to each other.

12. A system in accordance with claim 11 wherein:
    the retarding force is proportional to a rate of movement of the movable member.

13. A system in accordance with claim 12 wherein the differential means comprises:
    (a) first and second sun gears respectively fixedly connected to the first and second shafts;
    (b) a plurality of pairs of first and second planetary gears, each pair being rotatably journaled on a common shaft and being disposed around the periphery of the sun gears, the first planetary gear of each pair being driven by the first sun gear and the second planetary gear of each pair being driven by the second sun gear;
    (c) a first fixed ring gear engaging each of the first planetary gears;
    (d) a second ring gear, rotatably journaled and engaging each of the second planetary gears; and
    (e) the movable member is coupled to the second ring gear to translate movement of the second ring gear into movement of the movable member.

14. A system in accordance with claim 13 wherein:
    the means for retarding uses hydraulic fluid 15. A system in accordance with claim 14 wherein:
    (a) the means for retarding comprises a piston which is axially movable within a closed chamber with the piston defining first and second fluid chambers between the piston and end walls of the chamber and a fluid passage connecting the first and second chambers with a cross-sectional area less than a cross-sectional area of the piston, hydraulic fluid being disposed in the chambers and the fluid passage and moving between the first and second chambers in response to movement of the movable member; and
    (b) the movable member is connected to the piston and movable in the axial direction so that movement of the movable member is retarded by movement of the hydraulic fluid through the fluid passage.

16. A system in accordance with claim 11 further comprising:
    means for indicating when a failure occurs in one of the axially aligned driven shafts.

17. A system in accordance with claim 16 wherein the means for indicating comprises:
    means for producing a signal indicating a shaft failure in response to movement of the movable member a predetermined distance.

18. A system in accordance with claim 17 wherein the means for producing a signal comprises:
    a switching means having a movable switch member, a predetermined relative movement of the two shafts with respect to each other causing the movable member to move and close an electrical circuit in the switching means.

19. A system in accordance with claim 18 wherein:
    the predetermined relative movement of the two shafts is substantially equal to the predetermined angular rotation.

20. A system for detecting and indicating a failure in one of first and second axially aligned drive lines rotating in the same direction comprising:
    (a) means coupling the driven shafts together to transmit torque from one of the shafts to the other of the shafts upon a predetermined relative angular rotation between the two shafts and providing a free zone of relative rotation between the shafts without transmitting torque between the shafts when the shafts have moved less than a predetermined angular rotation with respect to each other in the free zone of rotation;
    (b) means, coupled to the shafts, for moving a movable member a distance which is proportional to the degree of relative rotation between the shafts within the predetermined relative angular rotation within the free zone of rotation, the movable member engaging first and second fixedly positioned drivers which are spaced apart from each other by a constant distance, the first and second drivers being rotated in response to rotation of the first and second shafts with torque from the first and second drivers being transmitted to the movable member to move the movable member in a first direction when a rate of rotation of the first driver is higher than a rate of rotation of the second driver and to move the movable member in a second direction when the rate of rotation of the second driver is higher than the rate of rotation of the first driver; and
    (c) indicating means for detecting movement of the movable member over a predetermined distance and providing an indication of a failure in one of the first and second drive lines aligned.

21. A system in accordance with claim 20 wherein: movement of the movable member the predetermined distance corresponds to relative movement of the shafts substantially equal to the predetermined relative angular rotation within the free zone of rotation.

22. A system for detecting and indicating a failure in one of first and second axially driven shafts rotating in the same direction comprising
(a) means coupling the driven shafts together to transmit torque from one of the shafts to the other of the shafts upon a predetermined angular rotation of relative rotation between the two shafts and providing a free zone of relative rotation between the shafts without transmitting torque between the shafts when the shafts have moved less than the predetermined angular rotation with respect to each other in the free zone of rotation;
(b) differential means, coupled to the shafts, for moving a movable member a distance which is proportional to the degree of relative rotation between the shafts during relative rotation between the shafts less than the predetermined degree of relative rotation within the free zone of rotation, the differential means comprising;
 (i) first and second sun gears respectively fixedly connected to the first and second shafts,
 (ii) a plurality of pairs of first and second planetary gears, each pair being rotatably journaled on a common shaft and being disposed around the periphery of the sun gears, the first planetary gear of each pair being driven by the first sun gear and the second planetary gear of each pair being driven by the second sun gear,
 (iii) a first fixed ring gear engaging each of the first planetary gears,
 (iv) a second ring gear, rotatably journaled and engaging each of the second planetary gears, and
 (v) the movable member is coupled to the second ring gear and translates movement of the second ring gear into movement of the movable member; and
(c) indicating means for detecting movement of the movable member a predetermined distance 23. A system in accordance with claim 22 wherein: movement of the movable member the predetermined distance corresponds to relative movement of the shafts substantially equal to the predetermined relative angular rotation within the free zone of rotation.

* * * * *